B. E. MEACHAM.
INSTANTANEOUS WATER HEATER.
APPLICATION FILED FEB. 10, 1914.
1,103,801.
Patented July 14, 1914.
2 SHEETS—SHEET 2.
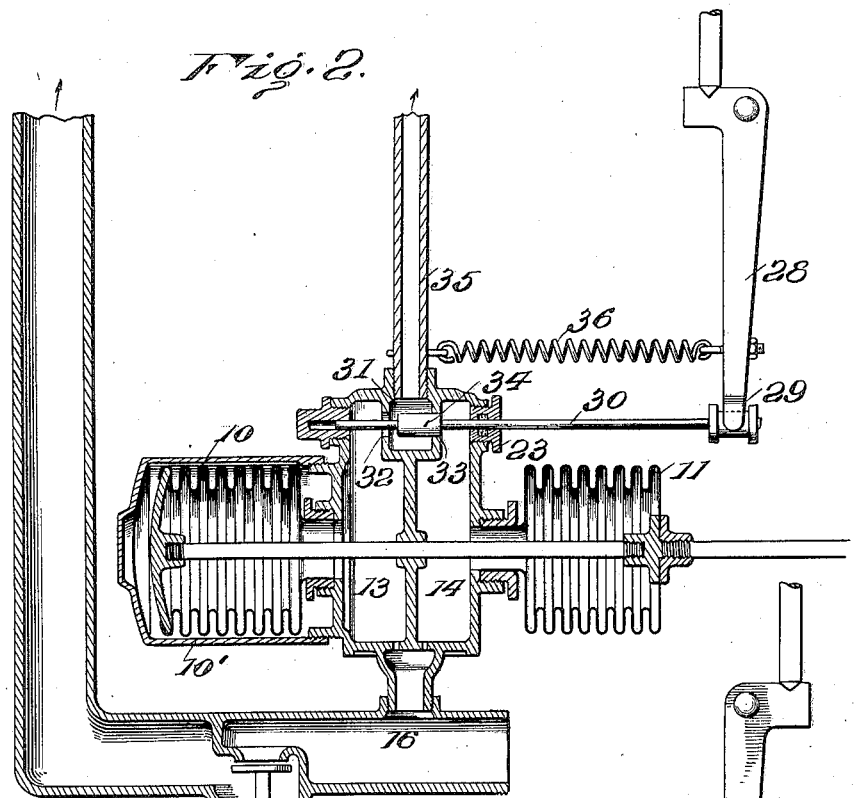
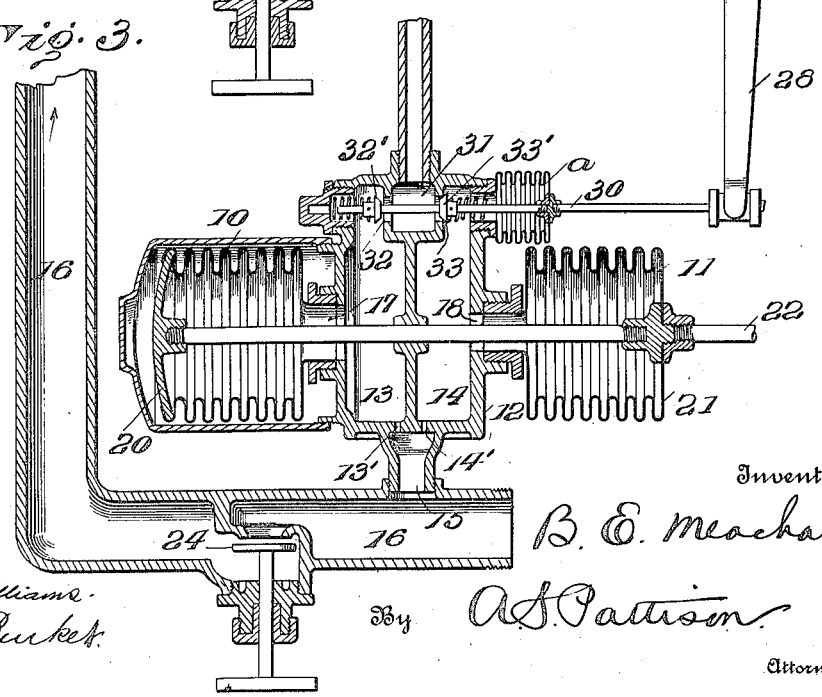
Witnesses
W. A. Williams
L. L. Burket
Inventor
B. E. Meacham,
By A. S. Pattison
Attorney

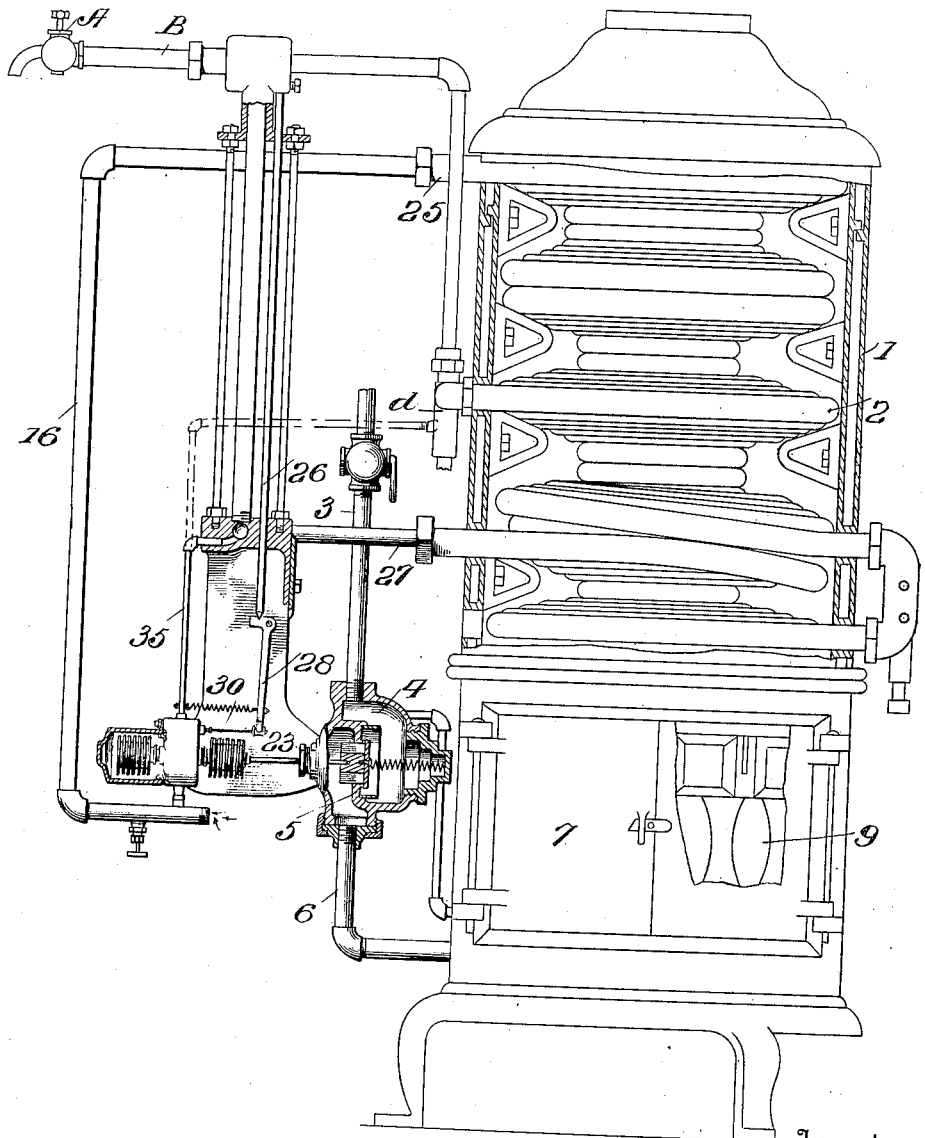

UNITED STATES PATENT OFFICE.

BENJAMIN E. MEACHAM, OF LORAIN, OHIO, ASSIGNOR TO AMERICAN STOVE COMPANY, OF ST. LOUIS, MISSOURI, A CORPORATION OF NEW JERSEY.

INSTANTANEOUS WATER-HEATER.

1,103,801. Specification of Letters Patent. Patented July 14, 1914.

Application filed February 10, 1914. Serial No. 817,849.

*To all whom it may concern:*

Be it known that I, BENJAMIN E. MEACHAM, a citizen of the United States, residing at Lorain, in the county of Lorain and State of Ohio, have invented certain new and useful Improvements in Instantaneous Water-Heaters, of which the following is a specification, reference being had therein to the accompanying drawing.

This invention relates to improvements in instantaneous water heaters, and particularly to automatic means for controlling the fuel supply to the burners of the heater, whereby the fuel is fed to the burners automatically when the hot water faucet is open; and the fuel automatically cut off when the hot water faucet is closed, and the flow of water maintained at a predetermined temperature when the hot water faucet is opened and the water is flowing through the heater.

In all of the instantaneous water heaters known to me now in use, they employ a valve located in the water supply pipe that is connected with the fuel controlling valve for turning on and cutting off the fuel respectively, when the water is flowing and when it is not flowing through the heater. It is recognized by those skilled in this art that such valves are liable to stick either open or closed, but the trouble in this respect is more often that it sticks open. This sticking open has been found to result from an obstruction of some kind getting in the way of the closing action of the valve; by corrosion, or for some reason the valve has become so tightened in its casing that the return spring therefor is not sufficiently strong to return it to its closed position. For this reason it is common in this type of heater to employ a thermostatic means for controlling the flow of gas independent of the water valve, so that should the water valve stick open the thermostat will act independent of the water valve to shut off the flow of gas and thus prevent injury or destruction of the heater by reason of the over heating of the water and raising it to a dangerous temperature, all of which is well-known and understood by those skilled in this art.

The primary object of my present invention is to so construct a fuel control for instantaneous water heaters that this water valve is omitted with its recognized liability to inoperativeness, and provide means which does not involve the use of a water valve for opening and closing the fuel valve respectively when the water is flowing through the heater and when it is not flowing through the heater, and to combine with this a thermostatic mechanism which will maintain the flowing water at a predetermined temperature through, but not independent of the water actuated means for initially controlling the fuel valve when the water is and is not flowing through the heater.

In the accompanying drawings: Figure 1 is a side elevation, partly in section, of a water heater with my improvement applied thereto. Fig. 2 is an enlarged vertical central sectional view through my improved fuel controlling mechanism. Fig. 3 is a view similar to Fig. 2, showing a modification of the water valve that is controlled by the thermostat.

Referring now to the drawings, 1 is a heater case; and 2 the coils or water-receptacle located therein. A gas supply pipe 3 is provided that supplies gas to a chamber 4 within which is located a fuel or gas controlling valve 5. An outlet fuel pipe 6 extends into the base 7 of the heater and is connected with a plurality of main burners 9, of any suitable construction. Thus far I have described what is common to the water heaters now in use.

My present improvement pertains to a mechanism for controlling the fuel valve 5 and thereby the flow of fuel to the main burners 9, in which construction the water valve heretofore used in instantaneous water heaters is omitted.

My improved fuel controlling mechanism embodies two expansible and contractible chambers 10 and 11, which are acted upon by the variation in the pressure of the water when flowing and when not flowing through the heater. These expansible and contractible chambers are constructed of what is well-known in the market as a "sylphon," the reliability of which has been thoroughly tested out and is well recognized in the trade. Located between these two sylphons is a casing 12, and this casing 12 is divided into two chambers 13 and 14. These two chambers 13 and 14 have lateral communications 13' and 14', with a passage 15, which in turn communicates with the water supply 16 from the main (not shown). The sylphon 10 has its inner open end 17 in communication with the chamber 13, and the sylphon 11 has its inner open end 18 in communication with the chamber 14. A rod 19 is connected rigidly with the closed ends 20 and 21 of the two sylphons 10 and 11, and this rod 19 is in turn connected with the fuel valve 5, by means of a rod 22 which passes through a suitable stuffing-box 23 of the gas chamber 4.

A valve 24 is located in the water supply-pipe 16 for regulating the flow and thereby the pressure of the water passing through the heater and this and the pipe 16 has its upper end 25 in communication with the upper end of the coil or water receptacle 2, the water passing downward therethrough, as is usual in these heaters. The particular construction of the water coil or receptacle 2 is immaterial to this invention and need not be described. Also as usual in these constructions, a thermostat 26 of the usual construction and so well known that any detailed description thereof is unnecessary, except to say that the thermostat is so located that it is within the circuit of the heated water, by means of a connection 27 and is thereby influenced by the temperature of the water flowing through the coil or receptacle 2. In the construction shown in Figs. 1 and 2, the thermostatic lever 28 has its lower and free end 29 connected with a sliding rod 30, and this sliding rod passes through the upper end of the chamber 12, and through an auxiliary chamber 31 located in the upper end of the casing 12. This auxiliary chamber 31 has a communication 32 with the chamber 13, and a communication 33 with the chamber 14. A valve 34 is carried by the rod 30 for controlling these communications 32 and 33 and the chamber 31 is in communication with the thermostat 26 by means of a pipe or passage 35. The thermostatic lever 28 is held in its proper position by means of a spring 36, which is connected at one end to the lever and at its other end with the pipe 35. Preferably, the sylphon 10 is slightly larger than the sylphon 11, and the sylphon 10 is preferably inclosed within a water-tight case 10', the functions of which will be pointed out in connection with the operation of the device.

In operation, with the hot water faucet A closed, the pressure of the water in the supply-pipe 16 flows into the chambers 13 and 14, and is equal in the two chambers. The sylphon 10 being larger than the sylphon 11, by reason of its increased area, it will overcome the expansive pressure of the water in the smaller sylphon 11 and draw the fuel valve 5 and hold it normally closed when water is not flowing through the heater. With the temperature of the water lowered, the thermostatic lever 28 and the valve 34 are normally in the position shown in Fig. 2, and this places the chamber 13 in communication with the pipe 35 through the communication 32 and chamber 31 with the outlet-pipe B in which the faucet A is located. With the parts in the position shown in Fig. 2, and the temperature of the water lowered below the predetermined temperature, the fuel-valve 5 is held closed for the reason just stated. When, however, the faucet A is opened, some of the water flows through the chamber 13 and the pressure of the water therein is lowered, while the chamber 14 is not in communication with the outlet pipe 35 and the pressure in the chamber 14 remains undisturbed and the smaller sylphon 11, by reason of the higher pressure in the chamber 14 overcomes the sylphon 10 causes it to contract and opens the fuel-valve 5, permitting the flow of fuel to the heater burners. When the water in the heater has reached the predetermined temperature, at which the thermostat 26 is set, then the thermostatic lever 28 is permitted to move in the direction indicated by arrow and the spring 36 pulls it with the rod 30 to move the valve 34 in position to close the communication 32. The valve 34 is of just the proper length to open the communication 33 just about when the communication 32 is closed, and at this point the water in the heater has reached the predetermined temperature. When the communication 33 is open, the chamber 14 is placed in communication with the outlet pipe 35 and the communication of the chamber 13 with the said pipe is cut off. By reason of this, the water pressure of the chamber 14 is increased in the chamber 13, with the result that the sylphon 10 expands, contracting the sylphon 11 and closes the fuel-valve 5, and cuts off the flow of fuel to the heater. As soon as the temperature of the water is lowered, the movement of the thermostatic lever 28 and the rod 30 is reversed and again shifts the higher water-pressure into the chamber 14, causing the fuel-valve 5 to again open. In this way the thermostat acts through the sylphons to control the flow of fuel to the burners according to the temperature of the water and while the water is flowing through the heater. It will be observed from this that the thermostat performs its function only when the water is flowing through the heater and that the initial opening and closing of the fuel valve when the faucet A is opened and closed is performed by the sylphons independent of the thermostat.

Attention is called to the fact that the pipe 35 is in communication with the thermostat 26 and that the water which flows through this pipe 35 does not pass through the heater. Consequently, the water passing through the pipe tends to cool the water passing from the heater, but since the thermostat is in the passage of the cold water from the pipe 35, the thermostat is affected thereby and thus maintains the flow of fuel sufficiently to have the water in the heater hot enough to heat the small amount of cold water passing through the pipe 35, and no more fuel is required to heat the water from the pipe 35 in this way than would be required if the water from pipe 35 passed through the heater. In fact, it may pass through the heater, but I prefer to have the chambers 13 and 14 communicate with the outlet B, so that these chambers are, in fact, between the coil 2 and the outlet faucet A, because there is greater reduction in the pressure of the water when it is flowing through the faucet A, between the coil and the faucet, than there is between the coil and the pipe 16, due to the friction of the water through the coil. By having the water which passes through the chambers 13 and 14 to flow directly into the outlet B, the friction of its passage through the coil 2 is obviated and the reduction in pressure within the chambers 13 and 14 is greater than the water that is flowing through the coil by reason of this method of connection. This form of fuel control is adapted to be used in places where the water valve construction can not be used. It is recognized that considerable water pressure is required to operate the water valve by reason of its friction and the spring which must be used to return it to its closed or normal position, and that in individual house systems where the water is in a tank in the upper part of the house, the pressure of the water is not sufficient to operate the water valve. In my improved construction there is practically no friction of the sylphons and they are more sensitive for that reason; there is no liability of failure to work by reason of friction and they will operate as herein described with a pressure such as would be present in these individual tank systems.

In Fig. 3, I show a slight modification in respect to the valve for controlling the communications 32 and 33. In this modification there is placed on the rod 30 two spring-actuated valves 32' and 33'. They act to control the communications 32 and 33 in the same way as the valve 34. In this connection I have shown a small sylphon $a$ in the place of the stuffing-box 23 of Figs. 1 and 2, simply to avoid the friction on the rod 30 and to prevent any leakage and the necessity for adjustment after use because of leakage.

By making the sylphon 10 larger than the sylphon 11 the necessity for a spring to hold the fuel valve 5 normally closed is obviated, for it will be understood that if the sylphons 10 and 11 were of the same size the pressure in the two would be equal when the water was not flowing through the heater. I desire it to be understood, however, that the two sylphons 10 and 11 could be of the same size and a spring utilized to normally close the fuel valve, the equal pressure in the two sylphons permitting the spring to act, and that the generic invention here disclosed is sufficiently comprehensive to involve such modification.

The object of providing the water-tight closure 10' for the sylphon 10 is that should the sylphon 10 become broken or leaky, for any reason, reducing the pressure therein, then the fuel valve might be opened by the sylphon 11. By providing this inclosing case 10', the water will be held within this case and equally within and without the sylphon and thus cause it to still operate and close the fuel valve until such repair could be made. However, in this instance, the sylphon does not engage the wall of the chamber 10' so there is no friction or possibility of sticking of the sylphon.

As already stated, the pipe 35 may be connected to have the water therefrom flow through the heater coil. Instead of having the pipe 35 communicate with the thermostat, as shown, in some instances, it would be desirable to have it connected with the middle of the coil, for instance, at the check valve $d$, as shown in dotted lines, instead of through the thermostat.

Having thus described my invention, what I claim and desire to secure by Letters Patent is:

1. A controlling device for water heaters, comprising in combination, a water supply, two sylphons in communication with the water-supply, a fuel controlling valve operatively connected with the sylphons, whereby one sylphon acts under the water pressure to close the fuel valve and the other by the reduction of water pressure to open the fuel valve.

2. A controlling device for water heaters, comprising a water supply, two oppositely acting sylphons in communication with the water supply, one sylphon acting against the other, a fuel valve operatively connected with the sylphons whereby the water pressure acting on one sylphon compresses one sylphon and closes the fuel valve, and a reduction in the water pressure permits the other sylphon to open the fuel valve.

3. A controlling device for water heaters, comprising a water-supply, two sylphons in communication therewith, a fuel supply valve operatively connected with the sylphon and automatic means for shifting the variation in water pressure from one sylphon to the other, whereby the fuel valve is normally held closed by the water-pressure and is opened by a reduction in the water pressure.

4. A controlling device for water heaters, comprising in combination a water-supply, two sylphons in communication therewith, one sylphon being larger than the other, a fuel valve operatively connected with the sylphon, and means for equalizing the water pressure in the sylphons when water is not flowing and for reducing the pressure in the large sylphon when the water is flowing, whereby the fuel valve is closed when the water is not flowing and is opened when the water is flowing.

5. A controlling device for water heaters, comprising a water supply, two sylphons in communication therewith, means for normally holding the fuel valve closed and automatic means for unbalancing the water-pressure between the sylphons when the water is flowing, for the purpose described.

6. A controlling device for water heaters, comprising a water supply, two sylphons in communication with the water supply, means for balancing the water pressure in the sylphons when not flowing through the heater, and means for reducing the water pressure in one of the sylphons when the water is flowing, and a fuel valve operatively connected with the sylphons to be respectively opened and closed by the variation of the water-pressure in the sylphons.

7. A controlling device for water heaters, comprising in combination a water supply, two sylphons in communication with the water-supply, a fuel valve operatively connected with the sylphons, means for balancing the water-pressure in said sylphons when the water is not flowing, means for reducing the pressure in one of the sylphons when the water is flowing, and a thermostat for controlling the said means.

8. A controlling device for water heaters, comprising a water supply, two chambers in communication with the water supply, a sylphon in communication with each of the said chambers, a connection between the sylphons, a fuel supply operatively connected with the sylphons and thermostatic controlling means for varying the pressure in the said chambers and thereby in the said sylphons according to the temperature of the water flowing through the heater, and thereby controlling the fuel supply.

9. A controlling device for water heaters, comprising a water-supply, two chambers in communication therewith, said chambers having a water outlet communication, two sylphons, one of each in communication with one of said chambers, a fuel valve operatively connected with the sylphons, a thermostatic controlling means for alternately placing said chambers in communication with the said outlet according to the temperature of the water flowing through the heater.

10. A controlling device for water heaters, comprising a water-supply, two chambers in communication with said water-supply, a sylphon in communication with one chamber and extending laterally therefrom, a sylphon in communication with the other chamber and extending laterally in the opposite direction, a connection between the sylphons, a fuel valve operatively connected with the sylphons, said chambers having outlet communications, and a thermostatic controlled means for controlling the outlets and thereby causing unequal pressures in the said chambers according to the temperature of the water passing through the heater for controlling the fuel valve.

11. A controlling device for water heaters, comprising in combination a water-supply, two chambers in communication therewith, each chamber having a sylphon in communication therewith and operative connection between the sylphons, a fuel valve, the sylphons having a common connection with the fuel valve, the chambers having a water-outlet, and a thermostatic controlled means controlling the water outlet from the chambers, for the purpose described.

12. A controlling device for water heaters, comprising in combination, a water-supply, two chambers in communication with the water-supply, each chamber having a sylphon communicating therewith, a thermostat, the chambers having a water outlet in communication with the thermostat, and means connected with the thermostat for controlling the outlet from the chambers, for the purpose described.

In testimony whereof I hereunto affix my signature in the presence of two witnesses.

BENJAMIN E. MEACHAM.

Witnesses:
  A. C. CALHOON,
  FLORENCE STEINHOFF.